United States Patent
Kuroki

(10) Patent No.: US 11,416,167 B2
(45) Date of Patent: Aug. 16, 2022

(54) SYSTEM, CONTROL METHOD THEREOF, AND STORAGE MEDIUM

(71) Applicant: CANON KABUSHIKI KAISHA, Tokyo (JP)

(72) Inventor: Daisuke Kuroki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/060,793

(22) Filed: Oct. 1, 2020

(65) Prior Publication Data
US 2021/0103402 A1   Apr. 8, 2021

(30) Foreign Application Priority Data

Oct. 4, 2019   (JP) .............................. JP2019-183846

(51) Int. Cl.
*G06F 3/00* (2006.01)
*G06F 3/06* (2006.01)
*G06F 13/28* (2006.01)

(52) U.S. Cl.
CPC .......... *G06F 3/0655* (2013.01); *G06F 3/0604* (2013.01); *G06F 3/0673* (2013.01); *G06F 13/28* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 10,924,430 B2* | 2/2021 | Thyamagondlu | ....... G06F 13/28 |
| 10,956,347 B2* | 3/2021 | Mishima | ................. G06F 3/061 |
| 2015/0149735 A1* | 5/2015 | Naie | ................... G06F 11/0751 |
| | | | 711/147 |
| 2020/0045099 A1* | 2/2020 | Naffati | ............... H04L 67/2842 |

FOREIGN PATENT DOCUMENTS

| | | |
|---|---|---|
| JP | 2002-123420 A | 4/2002 |
| JP | 2009-217750 A | 9/2009 |

* cited by examiner

*Primary Examiner* — Midys Rojas
(74) *Attorney, Agent, or Firm* — Canon U.S.A., Inc. IP Division

(57) ABSTRACT

A system includes a memory configured to store data, a first master configured to issue a first data transfer request to the memory, a division unit configured to divide the first data transfer request into a plurality of data transfer requests, and output the plurality of data transfer requests, and a second master configured to issue a second data transfer request to the memory.

20 Claims, 8 Drawing Sheets

| No | TOTAL DATA TRANSFER LENGTH TO BE TRANSFERRED WITHIN UNIT TIME | MINIMUM DATA TRANSFER LENGTH |
|---|---|---|
| 1 | UP TO 1024 | 64 |
| 2 | 1025 TO 2048 | 128 |
| 3 | 2049 OR MORE | 256 |

SYSTEM, CONTROL METHOD THEREOF, AND STORAGE MEDIUM

BACKGROUND OF THE DISCLOSURE

Field of the Disclosure

The aspect of the embodiments relates to a system, a control method thereof, and a storage medium.

Description of the Related Art

An image processing system represented by a display is a data processing system that is required to continue completing image processing by a predetermined amount of data within a certain unit time. When image data to be displayed is input to a display that displays image data at a rate of 60 frames per second, the display is to perform various kinds of image processing, such as vertical/horizontal rotation processing, super-resolution processing for increasing the resolution, and edge enhancement, on the image data at a rate of one frame per about 16 ms, and to continue outputting the processed image data to a panel thereof. In a case where data processing for one image frame cannot be completed within 16 ms, an image presented by the display and viewed by a user can flicker or be partially filled with noise, and thus the display is not acceptable as a product.

Depending on the image processing to be applied such as the vertical/horizontal rotation processing or the super-resolution processing for increasing the resolution by referring to a plurality of frames, the display may perform the image processing while reading image data of one or more frames from a memory after writing the image data temporarily to the memory. Thus, the display is a data processing system that performs pipeline image processing while passing the image data between image processing modules each performing image processing, as well as performs memory access for writing and reading the image data to and from the memory. Further, the display is a data processing system that is required to continue completing such data processing within a certain unit time, more specifically in this example, at a rate of one image frame per about 16 ms.

In addition, the display not only presents the input image data with improved image quality on the panel, but also presents graphics that represent various kinds of information, such as a menu for the user to operate the display and currently displayed channel information, so as to be superimposed on the image data. For such user interface (UI) graphics, it is common that rendering by a central processing unit (CPU) or software processing with assistance of hardware in part is performed in order to achieve a flexible display that can be set and customized by the user. In the rendering processing for UI graphics, the CPU reads a rending command from a memory, executes rendering based on the command, and then writes graphics data to the memory as a result of the rendering. The processing is repeated until the graphics to be displayed are completed. The number of times of the rendering processing, i.e., the number of times of memory access before the completion of the graphics varies depending on the size and the complexity of the graphics. The memory access occurs as with the image processing.

However, unlike displaying the image data, the rendering processing for the graphics can be performed without time constraints. This is because, even if there is a delay in the rendering processing, the displayed image is prevented from flickering or being partially filled with noise by displaying no graphics or by delaying switching to the graphics. However, the delay in the rendering processing leads to a slow response to the user in displaying the UI graphics.

In a case where each of the image processing modules makes access to the memory, the image processing module continuously transfers large units of data, such as data corresponding to one horizontal line of an image, while occupying a memory bus for a certain period of time to effectively use the memory bandwidth of the data processing system. For example, in a display that presents an RGB 8-bit depth image in Full high definition (HD) (1920×1080 pixels), each image processing module continuously transfers data of 5760 bytes (1920×3) corresponding to one horizontal line while occupying a memory bus. The image processing module makes such memory access 1080 times, which corresponds to the number of vertical lines.

On the other hand, the memory access from the CPU in the rendering processing is performed in units of data corresponding to a cache line of a cash system of the CPU. The cache line varies depending on the data processing system, and the size of the cache line is, in general, 256 bytes or 512 bytes. The CPU intermittently performs data transfer of a size smaller than the size of one data transfer performed by the image processing module, until the rendering is completed.

In recent years, the resolution of an image handled by a display has dramatically improved to Full HD (1920×1080 pixels), 4K2K (3840×2160 pixels), and 8K4K (7680×4320 pixels). Thus, the amount of data to be accessed by the image processing module to write and read data to and from a dynamic random access memory (DRAM) within the unit time has also dramatically increased. However, the improvement of the memory bandwidth of the DRAM is slower than the increase of the amount of data to be accessed within the unit time. For this reason, the memory access by the image processing module occupies a large portion of the memory bandwidth of the data processing system. As a result, the allocation of the memory bandwidth to the memory access from the CPU that performs the UI rendering has a tendency to decrease. In addition, because the memory access from the CPU can be inserted only between the large continuous data transfer by the image processing module and the large continuous data transfer by the next image processing module, the latency of the memory access has a tendency to increase and the speed of the response in displaying the UI graphics has a tendency to decrease.

During and immediately before and after a blanking period in which no image data to be processed is input, there is no memory access from the image processing module, or the number of image processing modules making the memory access is limited, and thus the CPU is allowed to continuously make the memory access. However, when the CPU makes the memory access in rendering the UI, the size of the data transfer is small and the rendering is executed between the data transfers. Thus, even in a situation where the memory access can be continuously made, a gap occurs between the data transfers and the memory bandwidth cannot be effectively used.

Japanese Patent Application Laid-Open No. 2002-123420 discusses reducing latency of memory access from a CPU by dividing a continuous data transfer into a plurality of data transfers by a predetermined data transfer length, and inserting the memory access from the CPU between the plurality of data transfers.

Japanese Patent Application Laid-Open No. 2009-217750 discusses reducing memory access latency for a high-priority data transfer by dividing a low-priority data transfer into a plurality of data transfers using priority information included in data transfer request information, and inserting the high-priority data transfer between the plurality of low-priority data transfers.

However, in a case where the continuous data transfer from the image processing module is divided when the data transfer request is made by the CPU, use efficiency of the memory bandwidth decreases, and the allocation of the memory bandwidth to the image processing module also decreases. Therefore, there is an issue where, at worst, the image processing module cannot complete the required data transfer within the unit time and thus the displayed image is distorted.

In addition, in a case where whether to divide the data transfer is determined using the priority information, if the priority of the data transfer request from the CPU is raised, the allocation of the memory bandwidth to the image processing module decreases, and at worst, the displayed image is distorted, as with the above-described case. If the priority of the data transfer request from the image processing module is raised, the data transfer from the image processing module is not divided, and thus the latency of the memory access from the CPU is the same as that in the current situation. Moreover, with the improvement of the resolution of the image data to be handled by the data processing system, the amount of data to be requested by the image processing module, i.e., the transfer length and the frequency of the continuous data transfer has also a tendency to increase. As a result, the latency of the memory access from the CPU has a tendency to increase. Therefore, the user faces an issue of a display that has a slow response in presenting UI graphics.

SUMMARY OF THE DISCLOSURE

A system includes a memory configured to store data, a first master configured to issue a first data transfer request to the memory, a division unit configured to divide the first data transfer request into a plurality of data transfer requests, and output the plurality of data transfer requests, and a second master configured to issue a second data transfer request to the memory.

Further features of the disclosure will become apparent from the following description of exemplary embodiments with reference to the attached drawings.

BRIEF DESCRIPTION OF THE DRAWINGS

FIG. 2 is a diagram illustrating a parameter table.

DESCRIPTION OF THE EMBODIMENTS

Figure 1:
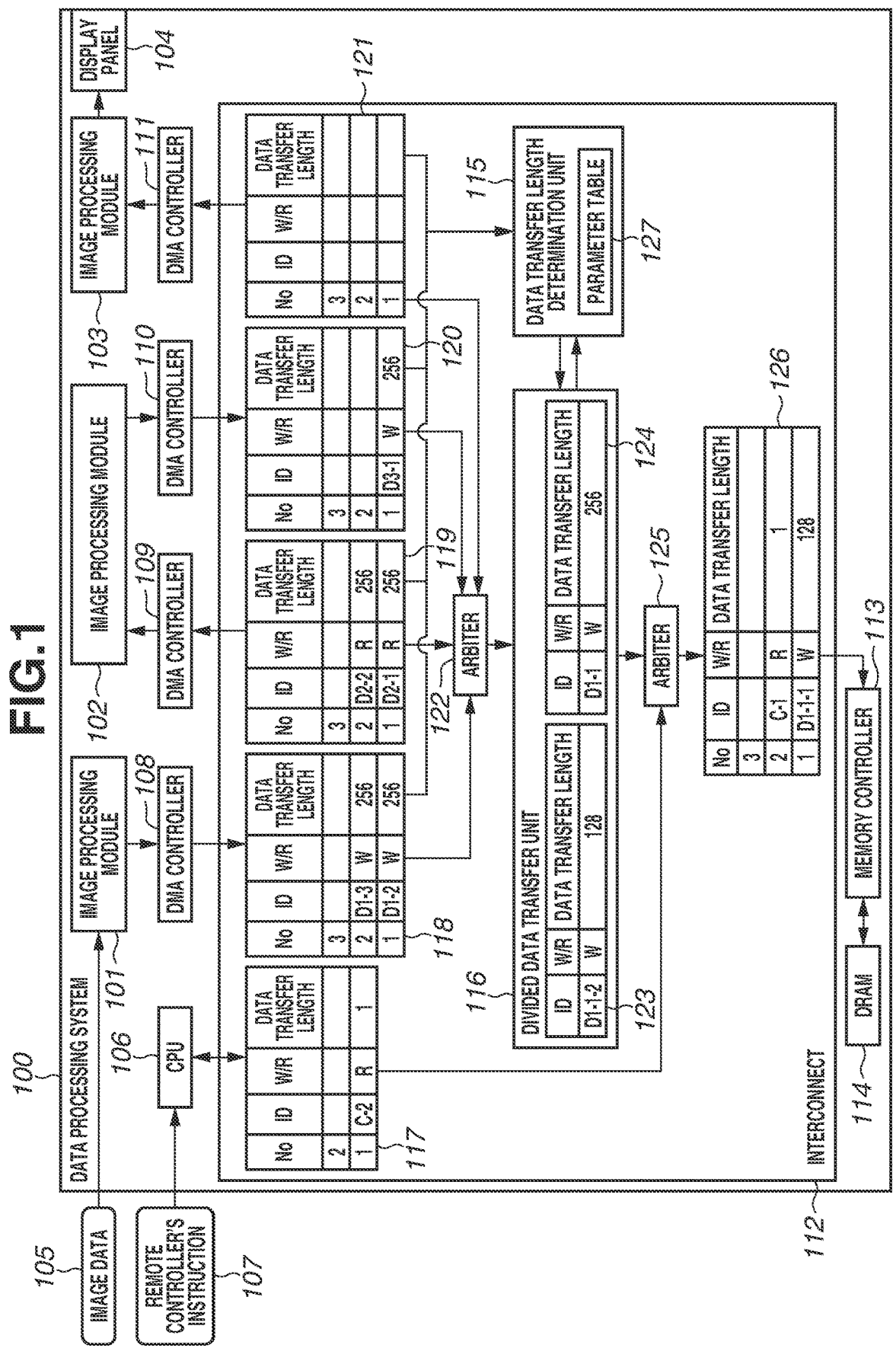
FIG. 1 is a block diagram illustrating a configuration example of a data processing system.

FIG. 1 is a diagram illustrating a configuration example of a data processing system 100 according to an exemplary embodiment. The data processing system 100 includes image processing modules 101 to 103, a display panel 104, a central processing unit (CPU) 106, direct memory access (DMA) controllers 108 to 111, an interconnect 112, a memory controller 113, and a dynamic random access memory (DRAM) 114. The interconnect 112 includes a data transfer length determination unit 115, a divided data transfer unit 116, a request first-in first-out (FIFO) 117, a request FIFO 118, a request FIFO 119, a request FIFO 120, a request FIFO 121, an arbiter 122, an arbiter 125, and a request FIFO 126. The data transfer length determination unit 115 includes a parameter table 127. The divided data transfer unit 116 includes a request FIFO 123 and a response FIFO 124.

When image data 105 to be displayed is input to the data processing system 100, the data processing system 100 applies image processing to the image data 105 using the three image processing modules 101 to 103 and then outputs the image data to the display panel 104, thereby displaying the image data.

The image processing modules 101 to 103 input and output the image data by using the DRAM 114, which is a memory, as a buffer. For the image processing modules 101 to 103, a plurality of the DMA controllers 108 to 111 is provided and each of the DMA controllers 108 to 111 issues a data transfer request for performing direct access to the DRAM 114.

After receiving the image data 105 and performing the image processing on the received image data 105, the image processing module 101 writes the image data to the DRAM 114 via the DMA controller 108. The image processing module 102 reads the image data, which is written to the DRAM 114 by the image processing module 101, from the DRAM 114 via the DMA controller 109, and performs the image processing on the read image data. Then, the image processing module 102 writes the image data subjected to the image processing to the DRAM 114 via the DMA controller 110. The image processing module 103 reads the image data, which is written to the DRAM 114 by the image processing module 102, from the DRAM 114 via the DMA controller 111, performs the image processing on the read image data, and outputs the image data subjected to the image processing to the display panel 104. The interconnect 112 connects the four DMA controllers 108 to 111 and the memory controller 113 that controls access to the DRAM 114.

Further, when a remote controller's instruction 107 such as a menu display instruction from a user is input, the CPU 106 generates the corresponding user interface (UI) graphics using software rendering, superimposes the generated UI graphics on image data, and outputs the result to the display panel 104, thereby displaying a menu screen. The CPU 106 creates the graphics by repeating the cycle of reading a rendering command stored in the DRAM 114, executing the rendering processing, and writing a rendering result to the DRAM 114. The image processing module 103 reads the image data written to the DRAM 114 and the graphics generated by the CPU 106, superimposes the graphics on the image data, and outputs the result to the display panel 104.

As with the four DMA controllers 108 to 111, the CPU 106 is connected to the interconnect 112, and outputs a data transfer request to the DRAM 114 to make access to the DRAM 114. The interconnect 112 forms a bus connection in which the memory bandwidth of the DRAM 114 is shared among the CPU 106 and the four DMA controllers 108 to 111. The interconnect 112 receives the data transfer requests from the four DMA controllers 108 to 111 and from the CPU 106, and arbitrates the sequence of issuing the data transfer requests to the DRAM 114.

Each of the four DMA controllers 108 to 111 is a continuous access master that issues a request for continuously transferring large units of data while occupying the memory bandwidth of the DRAM 114 for a certain period of time, in order to continue completing predetermined image processing within a unit time.

The CPU 106 is a sporadic access master that intermittently issues a data transfer request, which requests a data transfer size smaller than that requested in one data transfer request of the continuous access master, until the rendering is completed. The CPU 106 has no constraints on the time to complete the generation of the graphics, but the shorter the memory access latency, the faster the response time from the input of the remote controller's instruction 107 to the display of the graphics.

Next, a configuration of the interconnect 112 will be described in detail. The interconnect 112 is a module including the data transfer length determination unit 115 and the divided data transfer unit 116. To receive the data transfer requests from the continuous access masters and the sporadic access master, the interconnect 112 includes the request FIFOs 117 to 121 corresponding to the respective masters. The interconnect 112 can receive the data transfer request from each of the masters in advance without waiting for a response from the DRAM 114, on condition that the maximum number of data transfer requests that can be received in advance is the number of rows in the corresponding request FIFO.

The request FIFO 117 can receive the data transfer request from the CPU 106. A control number (No) in the request FIFO 117, a unique identification (ID) for distinction from the data transfer requests of the other masters in the interconnect 112, write/read (W/R), and a data transfer length are registered in the request FIFO 117. W/R indicates whether data is to be written or read. The data transfer length indicates a data transfer length requested in one data transfer request. In the example illustrated in FIG. 1, the request FIFO 117 stores a data transfer request having an ID of C-2 which requests the reading of data with a data transfer length of 1. The request FIFO 117 has two rows and thus can receive two data transfer requests in advance. Actually, other kinds of information such as an access destination address in the DRAM 114 is also present in the request FIFO 117, but is omitted here.

Similarly, the request FIFO 118 can receive the data transfer request from the DMA controller 108, and stores two data transfer requests having IDs of D1-2 and D1-3, both of which request the writing of data with a data transfer length of 256. The request FIFO 118 has three rows and thus can receive three data transfer requests in advance.

The request FIFO 119 can receive the data transfer request from the DMA controller 109, and stores two data transfer requests having IDs of D2-1 and D2-2, both of which request the reading of data with a data transfer length of 256.

The request FIFO 120 can receive the data transfer request from the DMA controller 110, and stores one data transfer request having an ID of D3-1 which requests the writing of data with a data transfer length of 256.

The request FIFO 121 can receive the data transfer request from the DMA controller 111, and a data transfer request is not yet present therein.

The arbiter 122 arbitrates the sequence of issuing the data transfer requests from the four DMA controllers 108 to 111 (continuous access masters) and outputs the data transfer requests to the divided data transfer unit 116 in the arbitrated sequence. The arbiter 122 is a round-robin type arbiter that sequentially determines the data transfer request to be issued. For each of the data transfer requests, the arbiter 122 sequentially checks the request FIFOs 118 to 121, determines the data transfer request to be issued, extracts the determined data transfer request from the corresponding request FIFO, and outputs the extracted data transfer request to the divided data transfer unit 116.

The divided data transfer unit 116 receives the data transfer request of the continuous access master from the arbiter 122 in the arbitrated sequence, and stores the received data transfer request in the request FIFO 123. The divided data transfer unit 116 outputs the data transfer request to the arbiter 125 as long as the data transfer request is present in the request FIFO 123. When there is no more data transfer request in the request FIFO 123, the divided data transfer unit 116 receives the next data transfer request from the arbiter 122.

The arbiter 125 arbitrates the sequence of issuing the data transfer requests to the DRAM 114, among the data transfer requests of the continuous access masters received from the divided data transfer unit 116 and the data transfer request received from the request FIFO 117. The arbiter 125 is a round-robin type arbiter that sequentially determines the data transfer request to be issued, as with the arbiter 122. The arbiter 125 extracts the data transfer request from the request FIFO 117 or from the divided data transfer unit 116 based on the sequence determined by the arbiter 125, and stores the extracted data transfer request in the request FIFO 126.

The request FIFO 126 issues the data transfer requests to the memory controller 113 to make access to the DRAM 114, in a sequence in which the data transfer requests are registered in the request FIFO 126. The DRAM 114 is a memory that stores data.

Next, the data transfer length determination unit 115 and the divided data transfer unit 116 will be described. When an acquisition request is input from the divided data transfer unit 116, the data transfer length determination unit 115 determines a minimum data transfer length for dividing the data transfer request issued by each of the DMA controllers 108 to 111, and outputs the minimum data transfer length to the divided data transfer unit 116. The minimum data transfer length is determined based on remaining unit time information, a total data transfer length that is the sum of the data transfer lengths registered in the request FIFOs 118 to 121 and 123, and information in the parameter table 127 held by the data transfer length determination unit 115.

Next, the remaining unit time information will be described. The unit time within which each of the DMA controllers 108 to 111 (continuous access masters) is to complete the required data transfer is the period of one horizontal synchronization signal (HSYNC) of the image data. The data transfer length determination unit 115 includes a timer, and resets the timer to start counting for each HSYNC. Thus, the data transfer length determination unit 115 can obtain the remaining unit time information indicating the ratio of the remaining time to one HSYNC period at the timing of receiving the request from the divided data transfer unit 116. For example, when the data transfer length determination unit 115 receives the request from the divided data transfer unit 116 at the same timing as the input of HSYNC, the remaining unit time information is 1, which corresponds to one HSYNC period. When the data transfer length determination unit 115 receives the request from the divided data transfer unit 116 after a half of one HSYNC period has elapsed, the remaining unit time information is 0.5. The remaining unit time information is the ratio of the remaining time to the unit time. The unit time is one HSYNC period.

Next, the total data transfer length will be described. The data transfer length determination unit 115 acquires the data transfer lengths registered in the request FIFOs 118 to 121 and 123 when receiving the request from the divided data transfer unit 116, and sums the acquired data transfer lengths, thereby obtaining the total data transfer length. The total data transfer length is the sum of the data transfer lengths of the data transfer requests that are issued by the DMA controllers 108 to 111 and have not yet accessed the DRAM 114. In the example illustrated in FIG. 1, when the data transfer length determination unit 115 receives the request from the divided data transfer unit 116, the total data transfer length is the sum of 256, 256, 256, 256, 256, and 128 and thus 1408 in total.

FIG. 2 is a diagram illustrating a configuration example of the parameter table 127. The parameter table 127 registers the total data transfer length to be transferred within the unit time, i.e., within one HSYNC period, and the corresponding minimum data transfer length to be set. In the parameter table 127 in FIG. 2, in a case where the total data transfer length to be transferred within the unit time is 1024 or less, the minimum data transfer length is 64. Similarly, in a case where the total data transfer length to be transferred within the unit time is 1025 or more and 2048 or less, the minimum data transfer length is 128. In a case where the total data transfer length to be transferred within the unit time is 2049 or more, the minimum data transfer length is 256. The term "total data transfer length to be transferred within the unit time" in the parameter table 127 is a parameter set beforehand by calculating the total data transfer length that can be transferred within the unit time in a case where the data transfer request with the minimum data transfer length and the data transfer request with one data transfer length are alternately issued.

When the acquisition request is input from the divided data transfer unit 116, the data transfer length determination unit 115 calculates the total data transfer length to be transferred within the unit time, based on the remaining unit time information and the total data transfer length. Subsequently, the data transfer length determination unit 115 determines the minimum data transfer length, based on the total data transfer length to be transferred within the unit time, by referring to the parameter table 127. For example, in a case where the remaining unit time information is 0.8 and the total data transfer length is 1408, the data transfer length determination unit 115 calculates the total data transfer length to be transferred within the unit time as 1760 (1408/0.8), and determines the minimum data transfer length as 128.

The divided data transfer unit 116 includes the request FIFO 123 and the response FIFO 124. The request FIFO 123 stores the data transfer request of the continuous access master transmitted from the arbiter 122. The divided data transfer unit 116 stores the data transfer request in the request FIFO 123, and also simultaneously stores the data transfer request in the response FIFO 124 which is an FIFO for responding to the data transfer request. Then, the divided data transfer unit 116 outputs the data transfer request to the arbiter 125. When the data transfer is permitted by the arbiter 125, the divided data transfer unit 116 outputs the acquisition request for the minimum data transfer length to the data transfer length determination unit 115, and receives the minimum data transfer length. The divided data transfer unit 116 is a division unit that divides the data transfer request stored in the request FIFO 123 into a plurality of data transfer requests based on the value of the minimum data transfer length, and outputs the plurality of data transfer requests to the arbiter 125. In this way, the divided data transfer unit 116 issues to the DRAM 114 the plurality of data transfer requests obtained by dividing the data transfer request. The divided data transfer unit 116 outputs the data transfer requests to the arbiter 125 until there is no more data transfer request stored in the request FIFO 123.

For example, in a case where the data transfer length in the data transfer request stored in the request FIFO 123 is 256 and the minimum data transfer length is 128, the divided data transfer unit 116 divides the data transfer request into two data transfer requests, each of which requests a data transfer length of 128, and outputs one of the data transfer requests to the arbiter 125. Subsequently, the divided data transfer unit 116 updates the data transfer length in the data transfer request stored in the request FIFO 123 to 128, which is the data transfer length that has not been transferred yet. Next, in a case where the minimum data transfer is 64, the divided data transfer unit 116 divides the data transfer request that requests a data transfer length of 128 into two data transfer requests, each of which requests a data transfer length of 64, transmits one of the data transfer requests to the arbiter 125, and updates the data transfer length in the data transfer request stored in the request FIFO 123 to 64, which is the data transfer length that has not been transferred yet. Next, in a case where the minimum data transfer length is 256, which is greater than a data transfer length of 64, the divided data transfer unit 116 outputs the data transfer request that requests a data transfer length of 64, to the arbiter 125, and the request FIFO 123 becomes empty. In a case where the data transfer length registered in the request FIFO 123 is smaller than the minimum data transfer length, the divided data transfer unit 116 outputs the data transfer request that requests the data transfer length registered in the request FIFO 123, to the arbiter 125.

When there is no more data transfer request stored in the request FIFO 123, the divided data transfer unit 116 receives the next data transfer request from the arbiter 122. In a case where the data transfer request requests the writing of data, the divided data transfer unit 116 transmits a response representing the completion of the writing, based on the data transfer request stored in the response FIFO 124. In a case where the data transfer request requests the reading of data, the divided data transfer unit 116 transmits the read data to the continuous access master, which is the issuer of the data transmission request, as a response based on the data transfer request stored in the response FIFO 124. After completing the response, the divided data transfer unit 116 deletes the relevant data transfer request from the response FIFO 124.

In FIG. 1, the divided data transfer unit 116 has received the data transfer request that requests the writing of data with a data transfer length of 256, as indicated by the response FIFO 124. The request FIFO 126 stores the data transfer request that requests a data transfer length of 128, which is obtained by dividing the data transfer request that requests the writing of data with a data transfer length of 256. The request FIFO 123 stores the data transfer request that requests a data transfer length of 128, which is the remaining data transfer length to be transferred for the data transfer request that requests the writing of data with a data transfer length of 256, and is in a state of waiting for permission from the arbiter 125 to issue the request.

The configuration of the data processing system 100 has been described so far. Next, operation of the data processing system 100 will be described with the passage of time.

Before a memory access pattern of the DMA controllers 108 to 111 (continuous access masters) and the CPU 106 (sporadic access master) is described, a memory access pattern of the continuous access master will be described.

Figure 3:
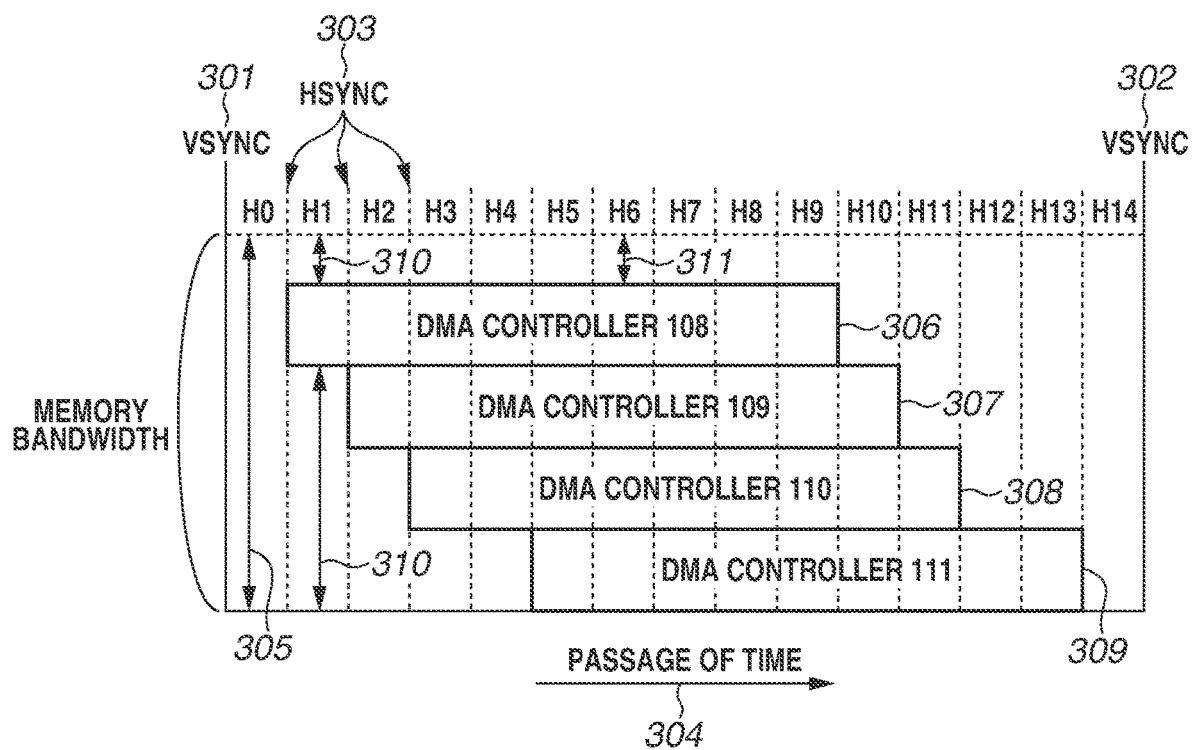
FIG. 3 is a diagram illustrating a relationship between a memory bandwidth and a memory access pattern.

FIG. 3 is a diagram illustrating a relationship between the memory bandwidth of the data processing system 100 and the memory access pattern of each of the DMA controllers 108 to 111 (continuous access masters) for the image processing modules 101 to 103. A horizontal axis indicates the time, and a vertical axis indicates the memory bandwidth.

Each of vertical synchronization signals (VSYNCs) 301 and 302 represents a vertical synchronization signal for display. Between the VSYNCs 301 and 302, an HSYNC is input 14 times. HSYNCs 303 are part of these HSYNCs. As illustrated in FIG. 3, each of periods H0 to H14 represents the period between the HSYNCs. Actually, in the case of Full HD (1920×1080 pixels), an HSYNC is input 1125 times. However, in the present exemplary embodiment, the number of input HSYNCs is reduced for easy understanding of the description. A horizontal axis 304 indicates the passage of time, and the time passes in the order of the periods H0, H1, and H2. The interval between the VSYNCs 301 and 302 is about 16 ms in a display that displays at a rate of 60 frames per second. A theoretical value of the memory bandwidth is calculated based on the width and the frequency of a data bus of the DRAM 114, and typically, an effective execution value is about 70% of the theoretical value.

The vertical axis indicates memory bandwidth usage of the DMA controllers 108 to 111 (continuous access masters) between the VSYNCs 301 and 302. A memory bandwidth amount 305 indicates a memory bandwidth amount of the DRAM 114 that can be effectively used at each HSYNC timing, and also indicates a memory bandwidth amount that can be used by the continuous access masters within the unit time during which the continuous access masters are to complete the required data transfer. An area 306 indicates a memory bandwidth amount required by the DMA controller 108 and HSYNC timings for the data transfer of the DMA controller 108. The DMA controller 108 has the memory bandwidth amount indicated by the vertical axis of the area 306 at the timings between the period H1 and the period H9.

Similarly, an area 307 indicates a memory bandwidth amount required by the DMA controller 109 and HSYNC timings for the data transfer of the DMA controller 109. An area 308 indicates a memory bandwidth amount required by the DMA controller 110 and HSYNC timings for the data transfer of the DMA controller 110. An area 309 indicates a memory bandwidth amount required by the DMA controller 111 and HSYNC timings for the data transfer of the DMA controller 111.

As indicated in FIG. 3, after the input of the VSYNC 301, the operation is started by the image processing module 101, the image processing module 102, and the image processing module 103 in this order, and is also completed in the same order. At the timing of the period H0, the CPU 106 can use the memory bandwidth amount 305. At the timing of the period H1, the CPU 106 can use a memory bandwidth amount 310. At the timing of the period H6, the CPU 106 can use a memory bandwidth amount 311.

Figure 4:
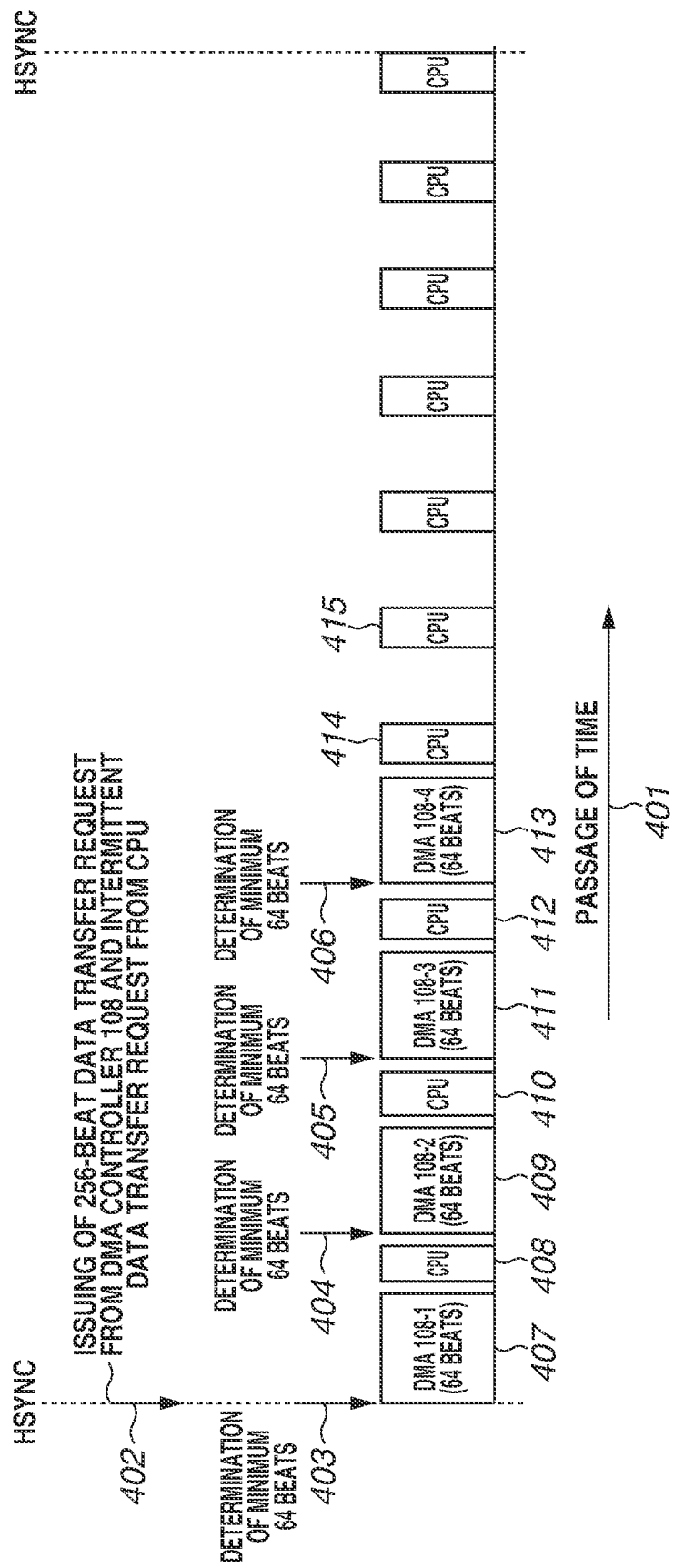
FIG. 4 is a diagram illustrating an example of a memory access pattern.

Next, the memory access pattern of the DMA controllers 108 to 111 (continuous access masters) and the CPU 106 (sporadic access master) will be described. The memory access pattern at the timing of the period H1 in FIG. 3 will be described with reference to FIG. 4.

A horizontal axis 401 indicates the direction in which time passes. Illustrated is a case where, at a timing 402 of the HSYNC, the data transfer request is issued from the DMA controller 108 (continuous access master) requesting a data transfer length of 256 and the intermittent data transfer request is issued from the CPU 106 (sporadic access master) for UI rendering.

At the timing 402, any DMA controller other than the DMA controller 108 does not issue the data transfer request, and thus in the arbiter 122, the data transfer request of the DMA controller 108 is selected, and the selected data transfer request is stored in the request FIFO 123 of the divided data transfer unit 116. When the data transfer request from the divided data transfer unit 116 is permitted by the arbiter 125 performing the arbitration, the divided data transfer unit 116 transmits the request for the minimum data transfer length to the data transfer length determination unit 115. At the timing of the period H1 in FIG. 3, the other continuous access masters do not request the data transfer, and thus the total data transfer length to be transferred within the unit time is small and the minimum data transfer length is 64, as illustrated in FIG. 2. Therefore, at a timing 403, the minimum data transfer length is 64, and as indicated by an area 407, the DMA controller 108 (continuous access master) issues the data transfer request that requests a data transfer length of 64.

Next, as indicated by an area 408, the CPU 106 (sporadic access master) issues the data transfer request that requests a data transfer length of 1. Then, similarly, at each of timings 404, 405, and 406, the divided data transfer unit 116 transmits the request for the minimum data transfer length to the data transfer length determination unit 115. Because the other continuous access masters do not request the data transfer, the total data transfer length to be transferred within the unit time is small and the minimum data transfer length is 64, as illustrated in FIG. 2. In areas 409, 411, and 413, the DMA controller 108 (continuous access master) issues the data transfer request that requests a data transfer length of 64. Between these areas, the CPU 106 (sporadic access master) issues the data transfer request that requests a data transfer length of 1, as indicated by areas 410 and 412.

In this way, the divided data transfer unit 116 divides the data transfer request issued by each of the DMA controllers 108 to 111 into a plurality of data transfer requests, and outputs the plurality of data transfer requests to the arbiter 125. The arbiter 125 outputs the data transfer request issued by the CPU 106, between periods of outputting the plurality of data transfer requests output by the divided data transfer unit 116. The latency for the data transfer of the CPU 106 (sporadic access master) can be thereby reduced.

As indicated by areas 414 and 415, in the rendering processing, even in a case where the CPU 106 (sporadic access master) can continuously perform the data transfer, the rendering is executed between the memory accesses, and thus a gap occurs in issuing the data transfer requests to the DRAM 114. Therefore, the CPU 106 cannot effectively use the memory bandwidth even in a case where the CPU 106 can occupy the memory bandwidth. However, as indicated by the areas 409, 411, and 413, the gap between the data transfers of the CPU 106 (sporadic access master) can be filled by inserting the data transfer of the DMA controller 108 (continuous access master). As a result, the memory bandwidth can be efficiently used.

Figure 5:
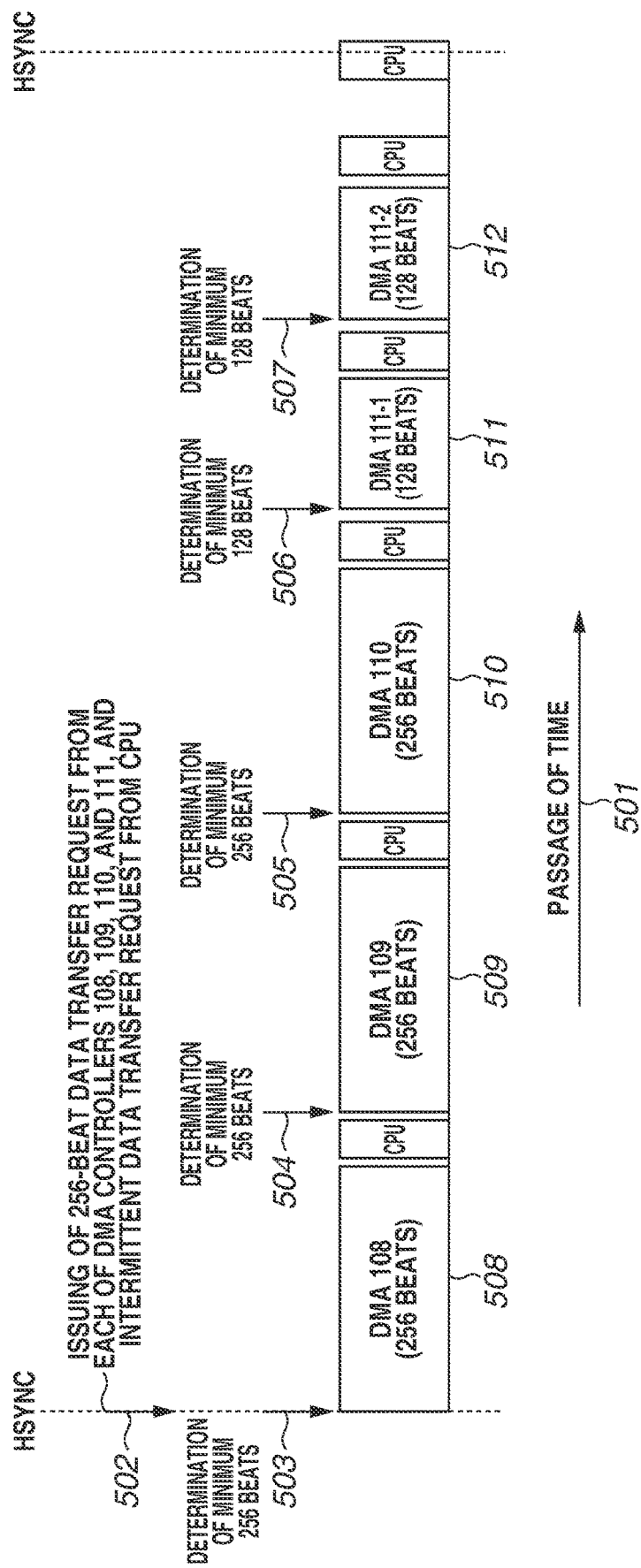
FIG. 5 is a diagram illustrating another example of the memory access pattern.

FIG. 5 is a diagram illustrating the memory access pattern at the timing of the period H6 in FIG. 3. A horizontal axis 501 indicates the direction in which time passes. At a timing 502 of the HSYNC, the data transfer request is issued from each of the DMA controllers 108 to 111 (continuous access masters) requesting a data transfer length of 256 and the intermittent data transfer request is issued from the CPU 106 for UI rendering.

Because the total data transfer length to be transferred within the unit time is large, the minimum data transfer length at each of timings 503, 504, and 505 is 256. As indicated by areas 508, 509, and 510, the data transfer request from each of the DMA controllers 108 to 110 (continuous access masters) is not divided. However, at timings 506 and 507, the total data transfer length to be transferred within the unit time is reduced and there is room for the remaining unit time, and thus the minimum data transfer length is 128. Therefore, as indicated by areas 511 and 512, the data transfer request is divided into two data transfer requests, each of which requests a data transfer length of 128, and the memory access from the CPU 106 (sporadic access master) is inserted between the two data transfers, and this contributes to a reduction in the latency of the CPU 106.

Figure 6:
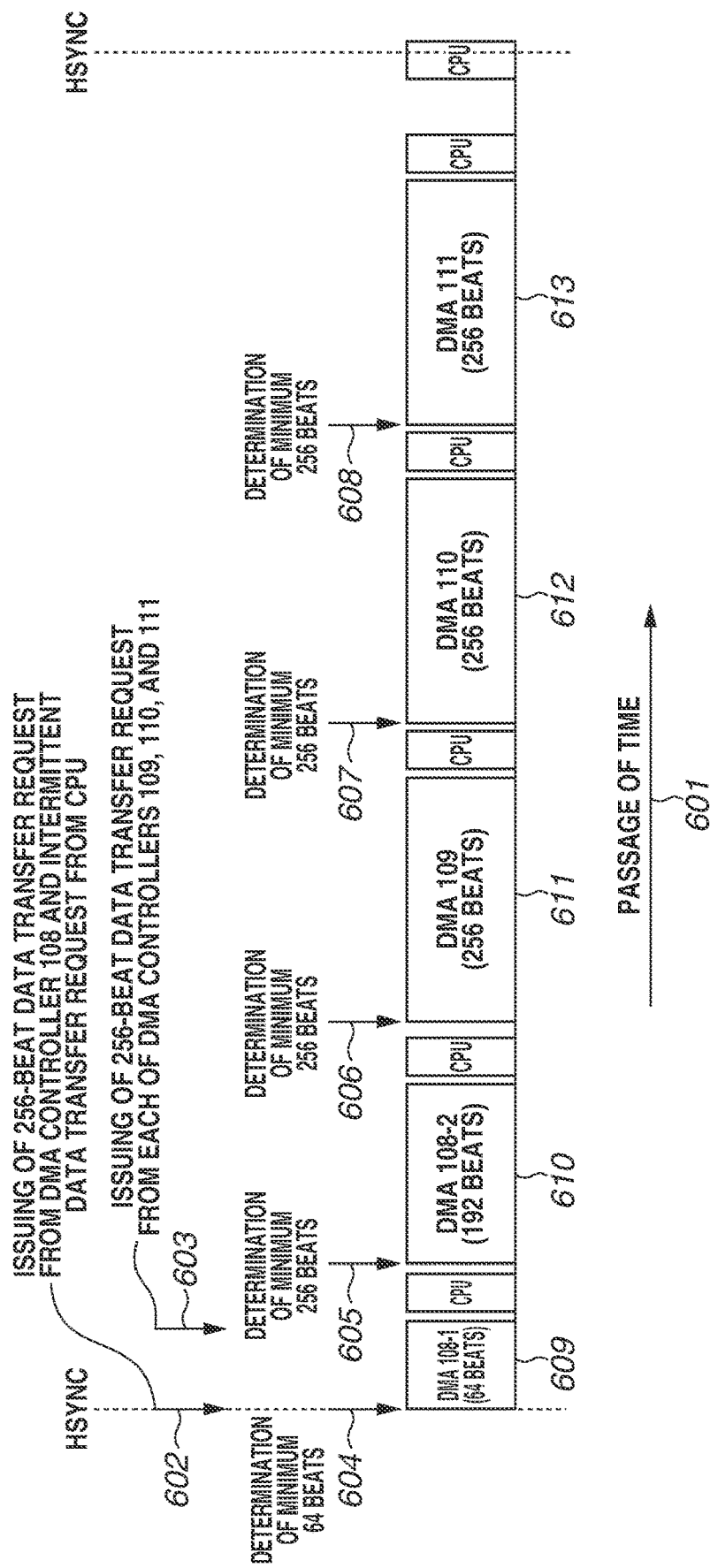
FIG. 6 is a diagram illustrating another example of the memory access pattern.

FIG. 6 is a diagram illustrating another example of the memory access pattern at the timing of the period H6 in FIG. 3. A horizontal axis 601 indicates the direction in which time passes. At a timing 602 of the HSYNC, the data transfer request is issued from the DMA controller 108 (continuous access master) requesting a data transfer length of 256 and the intermittent data transfer request is issued from the CPU 106 (sporadic access master) for UI rendering. At a timing 603, the data transfer request that requests a data transfer length of 256 is issued from each of the DMA controllers 109 to 111 (continuous access masters).

At a timing 604, among the continuous access masters, only the DMA controller 108 requests the data transfer, and thus the total data transfer length to be transferred within the unit time is small and the minimum data transfer length is 64. This is similar to the timing 403 in FIG. 4. Therefore, as indicated by the timing 604, the minimum data transfer length is 64, and as indicated by an area 609, the DMA controller 108 (continuous access master) issues the data transfer request that requests a data transfer length of 64. At a timing 605, the total data transfer length to be transferred within the unit time is increased and the minimum data transfer length is 256, and as indicated by an area 610, the DMA controller 108 issues the data transfer request that requests a data transfer length of 192, which is the remaining data transfer length after the data transfer request that requests a data transfer length of 64 is issued. Then, as indicated by timings 606, 607, and 608, the minimum data transfer length is 256, and as indicated by areas 611, 612, and 613, the data transfer requests that request a data transfer length of 256 are issued from the DMA controllers 109 to 111 (continuous access masters).

The data transfer request of the CPU 106 (sporadic access master) can be inserted between the areas 609 and 610 corresponding to the data transfer requests obtained by dividing the data transfer request of the continuous access master, and this contributes to a reduction in the latency for the data transfer of the CPU 106 (sporadic access master).

Figure 7:
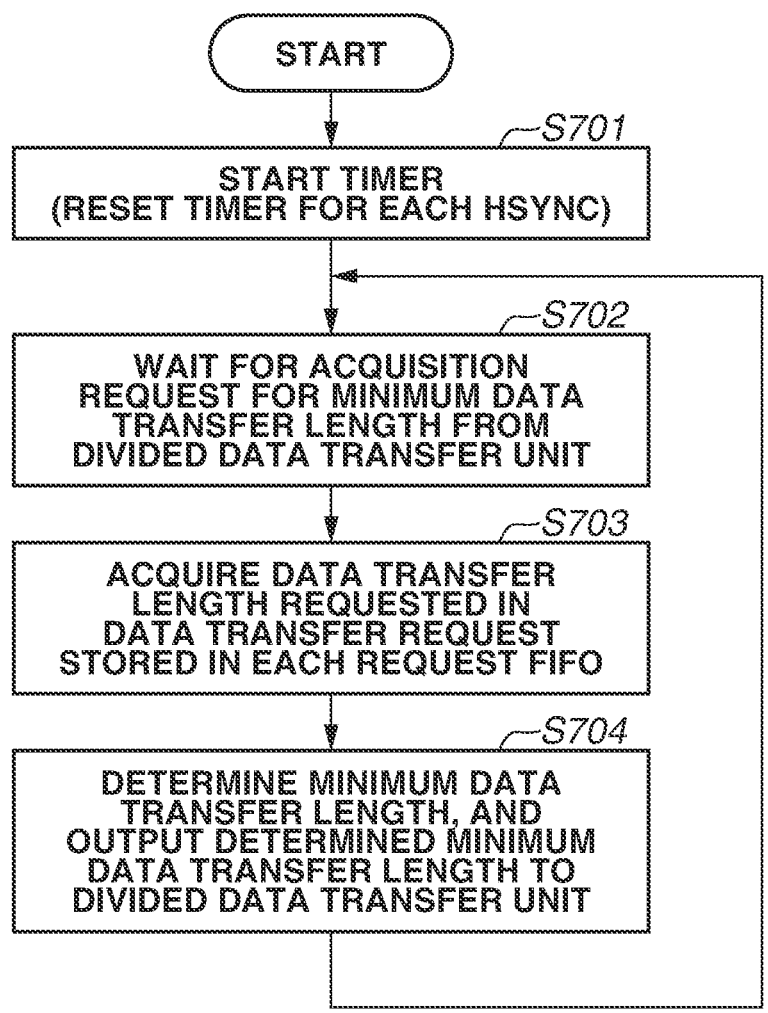
FIG. 7 is a flowchart illustrating a control method of a data transfer determination unit.

FIG. 7 is a flowchart illustrating a control method of the data transfer length determination unit 115. Upon starting, in step S701, the data transfer length determination unit 115 starts the timer to acquire the remaining unit time information, and resets the timer for each HSYNC.

In step S702, the data transfer length determination unit 115 waits for the acquisition request for the minimum data transfer length from the divided data transfer unit 116. When the acquisition request for the minimum data transfer length is input to the data transfer length determination unit 115, the operation proceeds to step S703.

In step S703, the data transfer length determination unit 115 acquires the data transfer length that is requested in each data transfer request stored in the request FIFOs 118 to 121 and 123, and sums the values of the acquired data transfer lengths, thereby calculating the total data transfer length. The operation then proceeds to step S704.

In step S704, the data transfer length determination unit 115 determines the minimum data transfer length based on the total data transfer length, the remaining unit time information, and the parameter table 127, and outputs the determined minimum data transfer length to the divided data transfer unit 116. The operation then returns to step S702.

Figure 8:
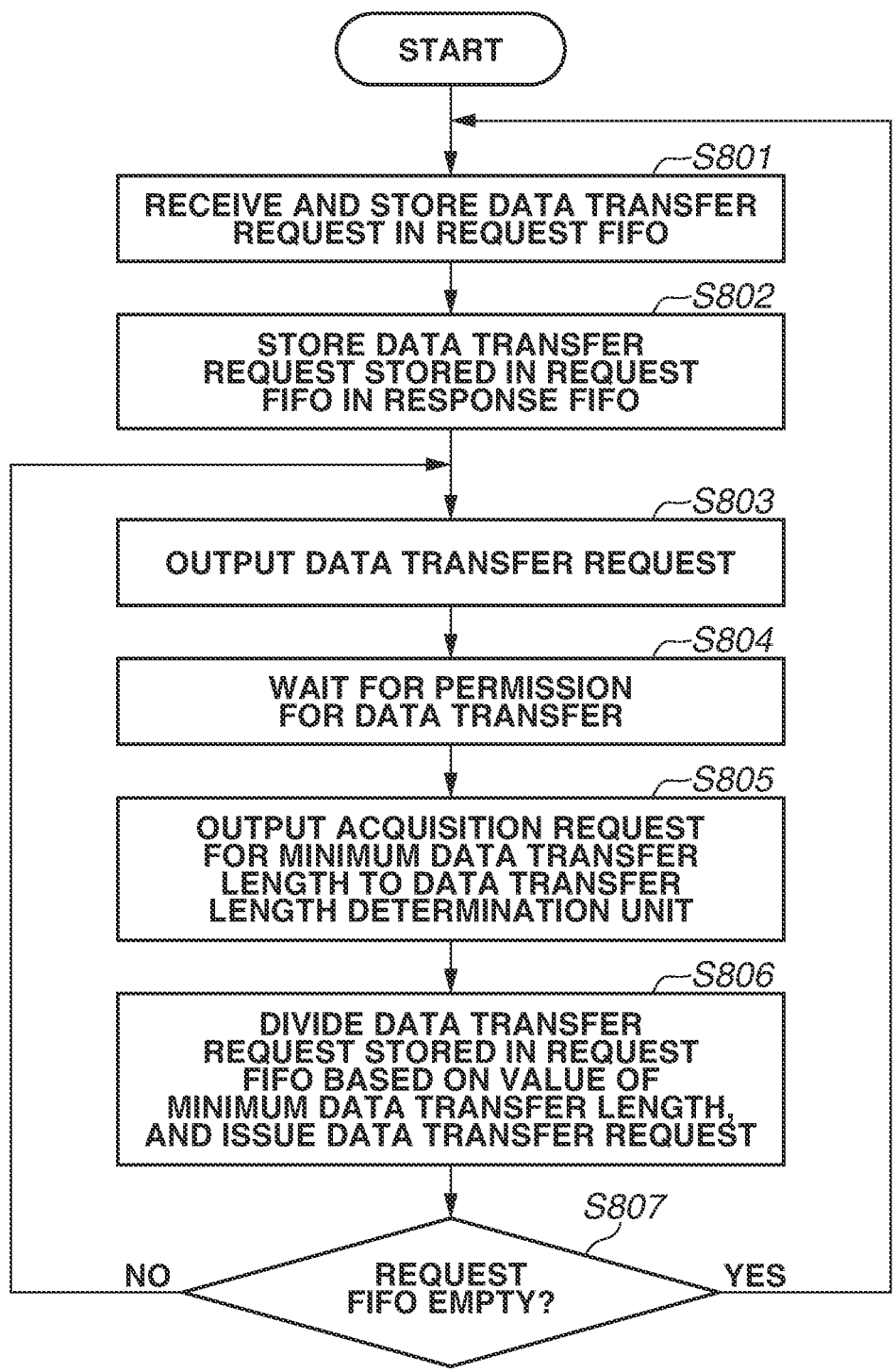
FIG. 8 is a flowchart illustrating a control method of a divided data transfer unit.

FIG. 8 is a flowchart illustrating a control method of the divided data transfer unit 116. In step S801, the divided data transfer unit 116 receives the data transfer request from the continuous access master permitted by the arbiter 122, and stores the received data transfer request in the request FIFO 123.

In step S802, the divided data transfer unit 116 stores the data transfer request received in step S801 in the response FIFO 124.

In step S803, the divided data transfer unit 116 outputs the data transfer request to the arbiter 125.

In step S804, the divided data transfer unit 116 waits for permission for the data transfer, and when the permission is obtained from the arbiter 125, the operation proceeds to step S805.

In step S805, the divided data transfer unit 116 outputs the acquisition request for the minimum data transfer length to the data transfer length determination unit 115, and when the minimum data transfer length is input to the divided data transfer unit 116, the operation proceeds to step S806.

In step S806, the divided data transfer unit 116 divides the data transfer request stored in the request FIFO 123 based on the value of the minimum data transfer length, and issues the data transfer request.

In step S807, the divided data transfer unit 116 checks whether the request FIFO 123 is empty. When the request FIFO 123 is empty (YES in step S807), the operation returns to step S801, and the divided data transfer unit 116 acquires the next data transfer request. When the request FIFO 123 is not empty (NO in step S807), the operation returns to step S803, and the divided data transfer unit 116 outputs the data transfer request to the arbiter 125.

In order to issue the data transfer request with the minimum data transfer length based on the latest total data transfer length, the divided data transfer unit 116 outputs the acquisition request for the minimum data transfer length to the data transfer length determination unit 115 after receiving the permission for the data transfer from the arbiter 125 in step S804. Alternatively, the divided data transfer unit 116 may output the acquisition request for the minimum data transfer length and acquire the minimum data transfer length between step S802 and step S803 before outputting the data transfer request to the arbiter 125.

As described above, the data processing system 100 can change the size for dividing the continuous data transfer from the image processing modules 101 to 103, depending on the use status of the memory bandwidth of the data processing system 100. Further, the data processing system 100 can insert the memory access from the CPU 106 between a plurality of data transfers obtained by dividing the continuous data transfer, to the extent that the memory bandwidth does not collapse. As a result, the data processing system 100 can reduce the latency of the memory access from the CPU 106, as well as can provide the user with the display panel 104 that displays UI graphics with a quick response.

In addition, the data processing system 100 can reduce the time interval for granting the right of access from the CPU 106 to the DRAM 114 to the extent that the memory bandwidth of the data processing system 100 does not collapse, and thus can improve the memory access latency.

The above-described exemplary embodiments are merely specific examples for implementing the disclosure, and the technical scope of the disclosure is not interpreted to a limited extent by these examples. In other words, the disclosure can be implemented in a variety of ways without departing from the technical idea or substantial feature thereof.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc. All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-183846, filed Oct. 4, 2019, which is hereby incorporated by reference herein in its entirety.

What is claimed is:

1. A system comprising:
a memory configured to store data;
a first master configured to issue a first data transfer request to the memory;
a division unit configured to divide the first data transfer request into a plurality of data transfer requests, wherein data transfer length of the plurality of data transfer requests changes according to a total data transfer length to be transferred within a unit time, and output the plurality of data transfer requests; and
a second master configured to issue a second data transfer request to the memory.

2. The system according to claim 1, further comprising an arbiter configured to output the second data transfer request, between periods of outputting the plurality of data transfer requests.

3. The system according to claim 1, further comprising an arbiter configured to arbitrate a sequence of issuing the plurality of data transfer requests issued by a plurality of first masters, and output the plurality of data transfer requests to the division unit in the arbitrated sequence.

4. The system according to claim 1, further comprising a determination unit configured to determine a minimum data transfer length for dividing the first data transfer request,
wherein the division unit divides the first data transfer request into the plurality of data transfer requests, based on the minimum data transfer length.

5. The system according to claim 4, wherein the determination unit determines the minimum data transfer length, based on the total data transfer length to be transferred within the unit time.

6. The system according to claim 5, wherein the unit time is a period of one horizontal synchronization signal.

7. The system according to claim 4, wherein the determination unit determines the minimum data transfer length, based on a sum of data transfer lengths of data transfer requests, which have not yet accessed the memory, among the plurality of data transfer requests, and a ratio of a remaining time to the unit time.

8. A method for controlling a system that includes a memory configured to store data, the method comprising:
 issuing a first data transfer request to the memory by a first master;
 dividing, by a division unit, the first data transfer request into a plurality of data transfer requests, and outputting the plurality of data transfer requests, wherein data transfer length of the plurality of data transfer requests changes according to a total data transfer length to be transferred within a unit time; and
 issuing a second data transfer request to the memory.

9. The method according to claim 8, further comprising outputting the second data transfer request, between periods of outputting the plurality of data transfer requests.

10. The method according to claim 8, further comprising arbitrating a sequence of issuing the plurality of data transfer requests issued by a plurality of first masters, and outputting the plurality of data transfer requests to the division unit in the arbitrated sequence.

11. The method according to claim 8, further comprising determining a minimum data transfer length for dividing the first data transfer request,
 wherein the dividing divides the first data transfer request into the plurality of data transfer requests, based on the minimum data transfer length.

12. The method according to claim 11, wherein the determining determines the minimum data transfer length, based on the total data transfer length to be transferred within the unit time.

13. The method according to claim 12, wherein the unit time is a period of one horizontal synchronization signal.

14. The method according to claim 11, wherein the determining determines the minimum data transfer length, based on a sum of data transfer lengths of data transfer requests, which have not yet accessed the memory, among the plurality of data transfer requests, and a ratio of a remaining time to the unit time.

15. A non-transitory computer-readable storage medium storing a program for executing a method for controlling a system that includes a memory configured to store data, the method comprising:
 issuing a first data transfer request to the memory by a first master;
 dividing, by a division unit, the first data transfer request into a plurality of data transfer requests, and outputting the plurality of data transfer requests, wherein data transfer length of the plurality of data transfer requests changes according to a total data transfer length to be transferred within a unit time; and
 issuing a second data transfer request to the memory.

16. The non-transitory computer-readable storage medium according to claim 15, further comprising outputting the second data transfer request, between periods of outputting the plurality of data transfer requests.

17. The non-transitory computer-readable storage medium according to claim 15, further comprising arbitrating a sequence of issuing the plurality of data transfer requests issued by a plurality of first masters, and outputting the plurality of data transfer requests to the division unit in the arbitrated sequence.

18. The non-transitory computer-readable storage medium according to claim 15, further comprising determining a minimum data transfer length for dividing the first data transfer request,
 wherein the dividing divides the first data transfer request into the plurality of data transfer requests, based on the minimum data transfer length.

19. The non-transitory computer-readable storage medium according to claim 18, wherein the determining determines the minimum data transfer length, based on the total data transfer length to be transferred within the unit time.

20. The non-transitory computer-readable storage medium according to claim 18, wherein the determining determines the minimum data transfer length, based on a sum of data transfer lengths of data transfer requests, which have not yet accessed the memory, among the plurality of data transfer requests, and a ratio of a remaining time to the unit time.

* * * * *